US010614681B2

(12) United States Patent
Fawcett

(10) Patent No.: US 10,614,681 B2
(45) Date of Patent: *Apr. 7, 2020

(54) MERCHANDISE SECURITY SYSTEM INCLUDING RETRACTABLE ALARMING POWER CORD

(71) Applicant: InVue Security Products Inc., Charlotte, NC (US)

(72) Inventor: Christopher J. Fawcett, Charlotte, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,410

(22) Filed: Aug. 20, 2018

(65) Prior Publication Data

US 2018/0357868 A1 Dec. 13, 2018

Related U.S. Application Data

(63) Continuation of application No. 15/793,031, filed on Oct. 25, 2017, now Pat. No. 10,055,954, which is a
(Continued)

(51) Int. Cl.
*G08B 13/14* (2006.01)
(52) U.S. Cl.
CPC ..... *G08B 13/1418* (2013.01); *G08B 13/1409* (2013.01); *G08B 13/1445* (2013.01); *G08B 13/1454* (2013.01); *G08B 13/1463* (2013.01)
(58) Field of Classification Search
CPC ............ G08B 13/1418; G08B 13/1454; G08B 13/1463; G08B 13/1409; G08B 13/1445
(Continued)

(56) References Cited

U.S. PATENT DOCUMENTS 3,382,494 A 5/1968 Mahacsek
4,029,896 A 6/1977 Skinner
(Continued)

FOREIGN PATENT DOCUMENTS

CN 201319492 Y 9/2009
CN 202795620 U 3/2013
(Continued)

OTHER PUBLICATIONS

International Search Report and Written Opinion from corresponding International Application No. PCT/US2013/054851, dated Nov. 27, 2013 (11 pages).
(Continued)

*Primary Examiner* — John A Tweel, Jr.
(74) *Attorney, Agent, or Firm* — InVue Security Products Inc.

(57) ABSTRACT

A merchandise security system for an electronic item of merchandise is provided. In one example, the merchandise security system includes a continuous alarming power cord comprising at least one electrical conductor. The alarming power cord has a first end adapted to be electrically connected to the electronic item of merchandise and a second end. The merchandise security system also includes a reel for receiving the second end of the alarming power cord and adapted for storing at least a portion of the alarming power cord thereon. In addition, the merchandise security system includes monitoring circuitry in electrical communication with the alarming power cord and configured to detect an interruption in an electrical signal provided to the alarming power cord.

40 Claims, 2 Drawing Sheets

Related U.S. Application Data continuation of application No. 15/248,105, filed on Aug. 26, 2016, now Pat. No. 9,830,787, which is a continuation of application No. 14/793,051, filed on Jul. 7, 2015, now Pat. No. 9,430,922, which is a continuation of application No. 13/965,525, filed on Aug. 13, 2013, now Pat. No. 9,105,167.

(60) Provisional application No. 61/695,107, filed on Aug. 30, 2012.

(58) Field of Classification Search
USPC .................................................. 340/568.2
See application file for complete search history.

(56) References Cited

U.S. PATENT DOCUMENTS

| | | |
|---|---|---|
| 4,138,177 A | 2/1979 | van Valer |
| 4,157,542 A | 6/1979 | Smith |
| 5,124,685 A | 6/1992 | Rankin |
| 5,142,269 A | 8/1992 | Mueller |
| 5,481,607 A | 1/1996 | Hsiao |
| 5,701,981 A | 12/1997 | Marshall et al. |
| 6,140,923 A | 10/2000 | Lam |
| 6,386,906 B1 | 5/2002 | Burke |
| 6,419,175 B1 | 7/2002 | Rankin, VI |
| 6,433,274 B1 | 8/2002 | Doss et al. |
| 6,659,382 B2 | 12/2003 | Ryczek |
| 6,799,994 B2 | 10/2004 | Burke |
| 7,151,912 B1 | 12/2006 | Morrison |
| 7,327,276 B1 | 2/2008 | Deconinck et al. |
| 7,446,659 B2 | 11/2008 | Marsilio et al. |
| 7,667,601 B2 | 2/2010 | Rabinowitz et al. |
| 7,701,339 B2 | 4/2010 | Irmscher et al. |
| 7,714,722 B2 | 5/2010 | Marszalek et al. |
| 7,724,135 B2 | 5/2010 | Rapp et al. |
| 7,994,914 B2 | 8/2011 | Irmscher et al. |
| 8,013,740 B2 | 9/2011 | Irmscher et al. |
| 8,081,075 B2 | 12/2011 | Irmscher et al. |
| 8,089,357 B2 | 1/2012 | Irmscher et al. |
| 8,102,262 B2 | 1/2012 | Irmscher et al. |
| 8,106,772 B2 | 1/2012 | Irmscher et al. |
| 8,292,097 B2 | 10/2012 | Goldberg |
| 8,558,688 B2 | 10/2013 | Henson et al. |
| 8,604,927 B2 | 12/2013 | Sisney |
| 8,698,617 B2 | 4/2014 | Henson et al. |
| 8,698,618 B2 | 4/2014 | Henson et al. |
| 8,749,194 B1 | 6/2014 | Kelsch et al. |
| 8,985,541 B2 | 3/2015 | Horvath et al. |
| 9,105,167 B2 | 8/2015 | Fawcett |
| 9,125,501 B2 | 9/2015 | Reynolds et al. |
| 9,303,809 B2 | 4/2016 | Reynolds et al. |
| 9,430,922 B2 | 8/2016 | Fawcett |
| 9,460,594 B1 * | 10/2016 | Groth ................ G08B 13/1463 |
| 9,830,787 B2 | 11/2017 | Fawcett |
| 10,055,954 B2 * | 8/2018 | Fawcett ............ G08B 13/1418 |
| 2003/0058601 A1 | 3/2003 | Hunter |
| 2003/0232530 A1 | 12/2003 | Vista, Jr. et al. |
| 2009/0058643 A1 | 3/2009 | Groth |
| 2009/0267766 A1 | 10/2009 | Pasma |
| 2011/0047844 A1 | 3/2011 | Fawcett et al. |
| 2012/0043936 A1 | 2/2012 | Ferguson |
| 2012/0182146 A1 | 7/2012 | Berglund et al. |
| 2013/0161054 A1 | 6/2013 | Allison et al. |
| 2013/0241731 A1 | 9/2013 | Fawcett et al. |
| 2014/0062698 A1 | 3/2014 | Fawcett |
| 2016/0364964 A1 | 12/2016 | Fawcett |
| 2018/0047264 A1 | 2/2018 | Fawcett |

FOREIGN PATENT DOCUMENTS

| | | |
|---|---|---|
| GB | 162379 | 4/1921 |
| JP | 2007265138 A | 10/2007 |
| KR | 100988132 B1 | 10/2010 |

OTHER PUBLICATIONS

Petition for Inter Partes Review of U.S. Pat. No. 9,830,787, Oct. 31, 2019, 70 pages. (IPR2020-00105).

Petition for Inter Partes Review of U.S. Patent No. 10,055,954, Oct. 31, 2019, 70 pages. (IPR2020-00104).

Excerpts, "McGraw-Hill Dictionary of Scientific and Technical Terms, Sixth Edition." The McGraw-Hill Companies, Inc., 2003.

Excerpts, "New Webster's Dictionary and Thesaurus of the English Language." Lexicon Publications, Inc., 1993.

Parmley, Robert O., Excerpts, "Illustrated Sourcebook of Mechanical Components." The McGraw-Hill Companies, Inc., 2000.

"Hardware Maintenance Manual vol. 2: ThinkPad Computers, Fourth Edition." IBM Corporation, Apr. 1995.

* cited by examiner

MERCHANDISE SECURITY SYSTEM INCLUDING RETRACTABLE ALARMING POWER CORD

CROSS REFERENCE To RELATED APPLICATIONS

This application is a continuation of U.S. application Ser. No. 15/793,031, filed on Oct. 25, 2017, which is a continuation of U.S. application Ser. No. 15/248,105, filed on Aug. 26, 2016, and now U.S. Pat. No. 9,830,787, which is a continuation of U.S. application Ser. No. 14/793,051 filed on Jul. 7, 2015, and now U.S. Pat. No. 9,430,922, which is a continuation of U.S. application Ser. No. 13/965,525 filed on Aug. 13, 2013, and now U.S. Pat. No. 9,105,167, which claims the benefit of priority of U.S. Provisional Application No. 61/695,107, filed on Aug. 30, 2012, each of which is hereby incorporated by reference in its entirety.

FIELD OF THE INVENTION

Embodiments of the present invention relate generally to merchandise systems that provide power and security for an item of merchandise.

BACKGROUND OF THE INVENTION

U.S. Pat. No. 6,799,994 assigned to Telefonix, Inc. of Waukegan, Ill. discloses an apparatus and a method for the convenient management of cords associated with the retail display of an electronic item of merchandise, such as a video camera. The apparatus includes a multi-conductor power cable and a reel for dispensing and retracting the power cable. The apparatus further comprises an adapter cord selected from a plurality of adapter cords for electrically connecting the power cable to a variety of items of merchandise having different power and connection requirements. The power cable is directly coupled to an alarm module that activates an alarm in response to an electronic circuit being opened in the event that the power cable is cut or disconnected.

U.S. Patent Application Publication No. 2012/0043936 A1 assigned to RTF Research & Technologies, Inc. of Caledon, Ontario Canada discloses a charging and monitoring system for handheld electronic items of merchandise, such as cell phones, Blackberry's, PDAs, cameras and the like. The system includes a coaxial security and power cable having a conductive core. A portion of one end of the coaxial power cable is accumulated on a reel of a recoiler assembly, while the other end of the coaxial power cable is adapted to mechanically and electrically engage a preferred mounting pad for a handheld electronic item of merchandise. The end of the coaxial cable accumulated on the reel is electrically coupled to a power and alarm cable through an electrical connector, such as a conventional registered jack (RJ) plug and socket. The free end of the power and alarm cable is electrically coupled to a power and alarm router having multiple ports for electrical connection to multiple power and alarm cables. The mounting pad is adapted to provide power to a power input port of the handheld electronic item of merchandise by means of a conventional electrical connection, such as a standard USB cable extending from the mounting pad.

BRIEF SUMMARY OF THE INVENTION

Embodiments of the present invention are directed to merchandise security systems for an electronic item of merchandise. In one embodiment, the merchandise security system includes a continuous alarming power cord comprising at least one electrical conductor. The alarming power cord has a first end adapted to be electrically connected to the electronic item of merchandise. The merchandise security system also includes a reel for receiving a second end of the alarming power cord that is adapted for storing at least a portion of the alarming power cord thereon. The merchandise security system further includes monitoring circuitry in electrical communication with the alarming power cord and configured to detect an interruption in an electrical signal provided to the alarming power cord. Thus, the alarming power cord may not require a second cable selected from a plurality of adapter cables to provide an appropriate operating voltage and/or current to the electronic item of merchandise.

In one embodiment, the merchandise security system includes an alarm module comprising the monitoring circuitry and a power cable having a first end electrically coupled to the second end of the alarming power cord and a second end electrically connected to the alarm module. The second end of the alarming power cord and the first end of the power cable may each terminate in a transformer comprising a coiled spool of wire configured to electrically connect the alarming power cord and the power cable. Thus, the alarming power cord and the power cable may not be in direct wire-to-wire electrical communication. According to one example, the reel comprises a central hub portion for receiving the second end of the alarming power cord, wherein the first end of the power cable is electrically coupled to the second end of the alarming power cord at the central hub portion of the reel. The alarm module may be configured to generate an audible and/or a visible alarm in response to interruption of the electrical signal. Moreover, the second end of the alarming power cord may include a connector and the first end of the power cable may include a socket or plug configured to mate with the connector.

According to one embodiment, the merchandise security system further comprises a display stand for housing the reel and providing electrical power to the alarming power cord. The electronic item of merchandise may be configured to be removably secured on the display stand. Each of the reel and the display stand may include electrical traces configured to electrically couple with one another for providing electrical power through the alarming power cable to the electronic item of merchandise.

In other embodiments, the merchandise security system further comprises means for retracting the alarming power cord onto the reel, wherein the reel and the portion of the alarming power cord stored thereon are detachable from the means for retracting. The means for retracting the alarming power cord onto the reel may be biased by a biasing force to automatically retract the portion of the alarming power cord in the absence of a tensile pulling force that exceeds the biasing force. In one embodiment, the reel is rotatable for dispensing and collecting a predetermined portion of the alarming power cord. In addition, the first end of the alarming power cord may include a connector adapted to engage a power input port of the electronic item of merchandise. In one embodiment, the merchandise security system further comprises a strain relief block configured to be attached to the electronic item of merchandise, wherein a portion of the alarming power cord is configured to be routed through the strain relief block.

In one embodiment, a merchandise security system for an electronic item of merchandise is provided. The merchandise security system includes a continuous alarming power cord comprising at least one electrical conductor, wherein the alarming power cord has a first end including a connector adapted to engage a power input port of the electronic item of merchandise. The merchandise security system also includes a rotatable reel connected to a second end of the alarming power cord that is adapted for dispensing and collecting at least a portion of the alarming power cord thereon. The merchandise security system further includes monitoring circuitry in electrical communication with the alarming power cord.

According to another embodiment, a method for securing an electronic item of merchandise from theft is provided. The method may include electrically connecting a first end of a continuous alarming power cord to the electronic item of merchandise, wherein a second end of the alarming power cord is connected to a reel for storing at least a portion of the alarming power cord thereon. The method may also include electrically coupling the second end of the alarming power cord to a power source such that an electrical signal is provided to the alarming power cord, wherein an interruption in the electrical signal is detectable by monitoring electronics.

DETAILED DESCRIPTION OF EXEMPLARY EMBODIMENTS

Figure 1:
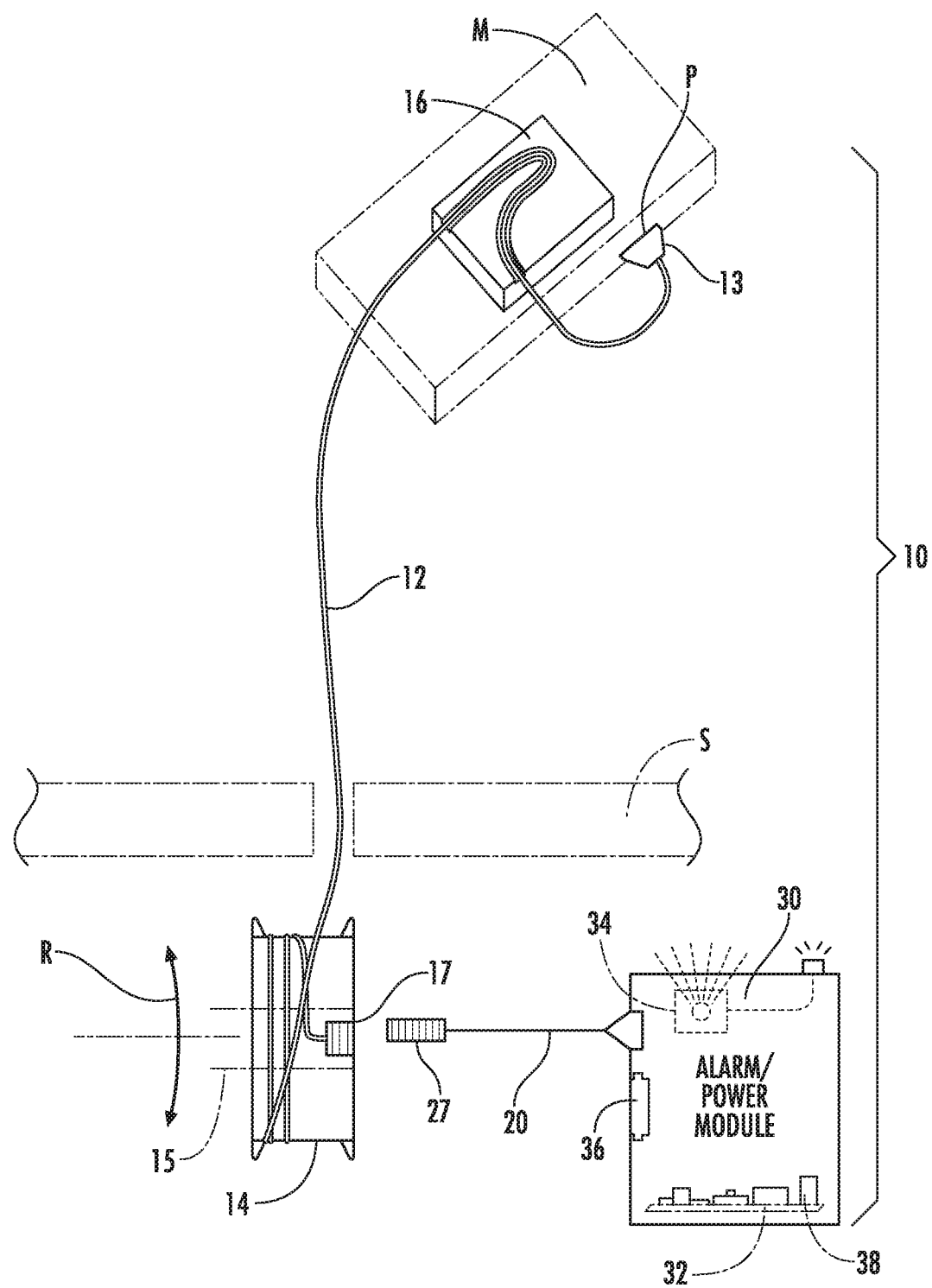
FIG. 1 is an environmental perspective view of a merchandise security system including a retractable alarming power cord and a rotatable reel according to the invention.

The accompanying drawing figures, wherein like reference numerals denote like elements throughout the various views, illustrate embodiments of a merchandise security system for providing power and/or security to an item of merchandise. By way of example and not limitation, the item of merchandise may be an electronic device, such as a mobile (e.g. cellular) telephone, media player, handheld game console, personal data assistant (PDA), global positioning satellite (GPS) device, handheld digital camera or video recorder, tablet computer, e-reader and the like, that requires electrical power for a potential purchaser to operate before making a decision whether to purchase the merchandise while the item is being displayed in a display area of a retail store and protected from theft by the merchandise security system.

Embodiments of the present invention are directed to a merchandise security system for protecting an electronic item of merchandise from theft, while providing power to the merchandise. In one embodiment, the merchandise security system includes an alarming power cord adapted for electrical connection to a power input port of the item of merchandise and a reel for retractably storing at least a portion of the alarming power cord. The alarming power cord may be electrically coupled to a power cable extending between a powered alarm module and a core portion of the reel. Power from the alarm module may be transferred to the alarming power cord by a conventional electrical connector (e.g. RJ type plug and socket), or alternatively, by induction via, for example, a transformer.

FIG. 1 shows a merchandise security system 10 according to one embodiment of the invention including an alarming power cord (also commonly referred to as an "alarming pigtail") 12 that is retractably wound on a rotatable reel 14, such that at least a portion of the alarming power cord is retractable onto the reel. The rotatable reel 14 is configured to dispense and collect a predetermined portion of the alarming power cord 12 and is biased to automatically retract the alarming power cord onto the reel in a known manner when a potential purchaser returns an item of merchandise M to a display support S, such as a stand, counter or the like. As such, the rotatable reel functions in the same or similar manner as a conventional recoiler or retractor of the type commonly employed with a retail merchandise display system. As shown in FIG. 1, the rotatable reel 14 and the means for retracting R the alarming power cord 12 on the reel may be separate such that the reel and the alarming power cord are detachable from the means for retracting to remove and replace the alarming power cord with a different alarming power cord configured for use with a different item of merchandise M.

In one embodiment, the alarming power cord 12 comprises at least one conductor (e.g., two conductors) for providing power at an appropriate current and/or voltage to the electronic item of merchandise M. As such, the alarming power cord 12 has a relatively small platform and is flexible relative to a mechanical security cable or a multi-conductor electrical power cable of the type disclosed in U.S. Pat. No. 6,799,994. The free end of the alarming power cord 12 may comprise an electrical connector 13, such a conventional micro-USB type power connector or a 30-pin Apple type power connector, adapted to engage a power input port P of the electronic item of merchandise M. If desired, a portion of the alarming power cord 12 adjacent the free end may be routed through an appropriately sized channel formed in a strain relief block 16 adapted to be attached to a surface of the electronic item of merchandise M, for example by a pressure sensitive adhesive (PSA). The strain relief block 16 prevents the electrical connector 13 of the alarming power cord 12 from being removed, disconnected or dislodged from the power input port P of the electronic item of merchandise M when tension is applied to the alarming power cord during extension and retraction of the alarming power cord from the reel 14 by a potential purchaser examining and/or operating the item of merchandise.

The other end of the alarming power cord 12 may terminate adjacent a central hub 15 of the rotatable reel 14. In one embodiment, the alarming power cord 12 terminates in an electrical transformer 17 comprising a coiled spool of wire. Alternatively, the alarming power cord 12 may terminate in a conventional electrical connector, such as a registered jack (RJ) type plug or socket. The merchandise security system 10 may further comprise a power cable 20 that extends between an alarm/power module 30 and the central hub 15 of the rotatable reel 14 to electrically connect the alarm/power module to the alarming power cord 12. Likewise, the end of the power cable 20 adjacent the hub 15 of the reel 14 may terminate in an electrical transformer 27 comprising a coiled spool of wire. Alternatively, the end of the power cable 20 may terminate in an electrical connector that is adapted to electrically couple the power cable 20 to the alarming power cord 12, such as a compatible registered jack (RJ) socket or plug. Regardless, the power cable 20 provides an electrical signal, including a power signal, to the alarming power cord 12 for charging and/or powering the electronic item of merchandise M via the electrical connector 13 and the power input port P of the item of merchandise. The alarm/power module 30 comprises monitoring electronics 32 that monitor the electrical signal in the power cable 20 and the alarming power cord 12 to determine whether the electrical signal has been interrupted, for example, by disconnecting the alarming power cord from the power input port P of the item of merchandise M, or by electrically decoupling the alarming power cord 12 from the power cable 20 at the central hub 15 of the rotatable reel 14, or by cutting/severing the alarming power cord 12 or the power cable 20 at any point between the alarm/power module 30 and the item of merchandise M. In the event that the electrical signal is interrupted, the alarm/power module 30 may activate an audible and/or a visible alarm 34 to alert store personnel to a potential theft of the electronic item of merchandise M. The alarm/power module 30 may be electrically connected to an external power supply (not shown), such as a standard 110 Volt Alternating Current (AC) outlet, or alternatively, may include an internal power supply, such as a conventional rechargeable battery 36, for providing power to the electronic item of merchandise M through the power cable 20 and the alarming power cord 12. Furthermore, the alarm/power module 30 may comprise voltage regulating electronics 38 adapted to convert the voltage and/or current provided by the power supply to an appropriate voltage and/or current for operating the electronic item of merchandise M.

It is important to note that the merchandise security system 10 comprises an alarming power cord 12 that extends continuously from the power input port P of the electronic item of merchandise M to an electrical coupling (e.g. 17, 27) disposed at the central hub 15 of the rotatable reel 14. Accordingly, the alarming power cord 12 does not comprise a first cable configured for electrical connection to a second cable selected from a plurality of adapter cables to provide an appropriate operating voltage and/or current to the electronic item of merchandise M. Furthermore, the alarming power cord 12 may not be in direct wire-to-wire electrical communication with the power cable 20 since the alarming power cord and the power cable may each comprise a corresponding electrical transformer 17, 27 formed by a coiled spool of wire. In addition, the merchandise security system 10 of the present invention further comprises a strain relief block 16 for preventing the electrical connector 13 at the free end of the alarming power cord 12 from being removed, disconnected or dislodged from the power input port P of the electronic item of merchandise M.

Figure 2:
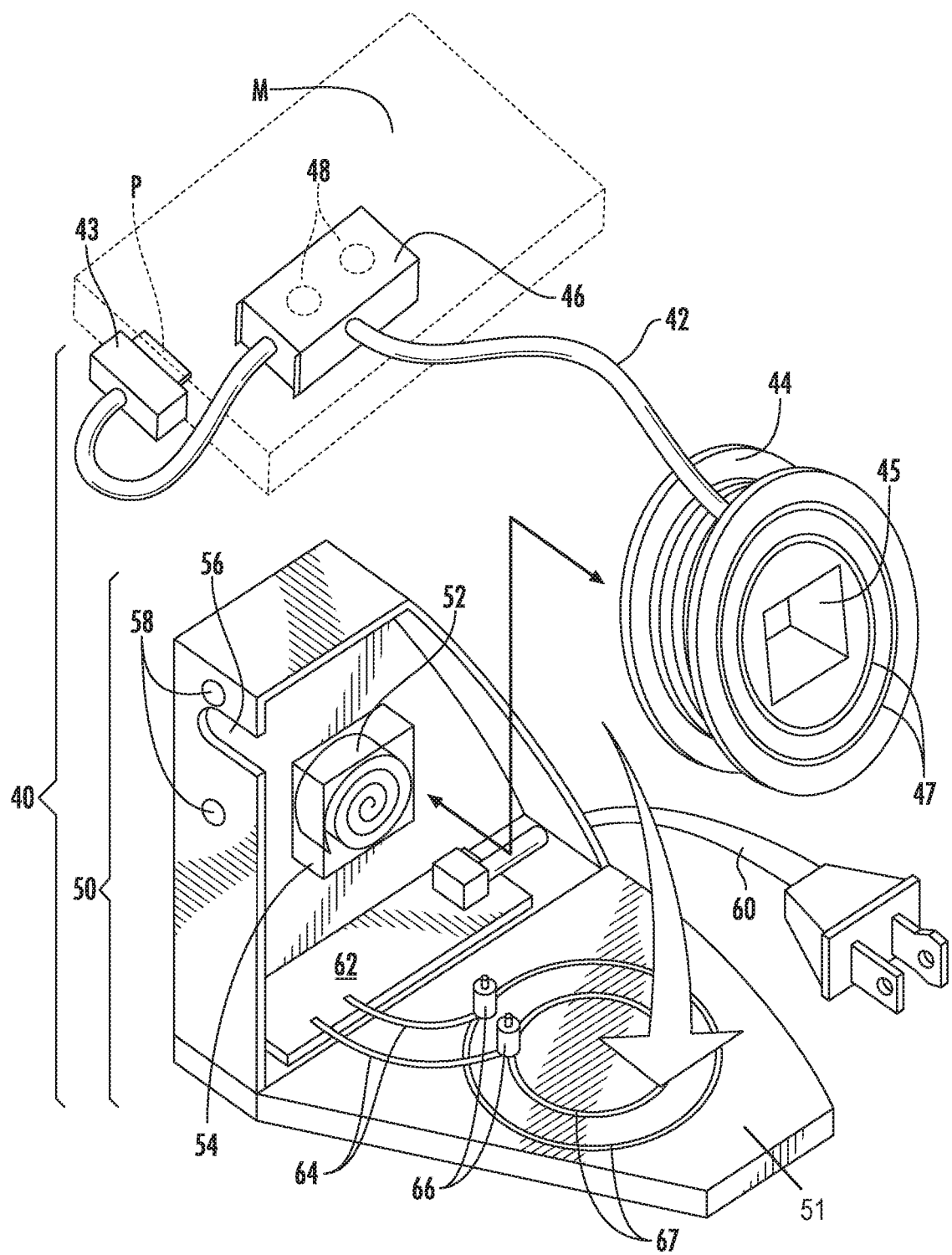
FIG. 2 is an exploded perspective view of a merchandise security system according to another embodiment of the present invention.

FIG. 2 shows another embodiment of a merchandise security system 40 according to the invention including an alarming power cord (also commonly referred to as an "alarming pigtail") 42 that is retractably wound on a rotatable reel 44, such that at least a portion of the alarming power cord is retractable onto the reel. The rotatable reel 44 is configured to dispense and collect a predetermined portion of the alarming power cord 42 and is biased to automatically retract the alarming power cord in a known manner when a potential purchaser returns an item of merchandise M to a display support, such as a stand, counter or the like. As such, the rotatable reel functions in the same or similar manner as a conventional recoiler or retractor of the type commonly employed with a retail merchandise display system. As shown in FIG. 2, the merchandise security system 40 further comprises a generally hollow display stand 50 configured for housing the rotatable reel 44 and for providing electrical power to the alarming power cord 42, and consequently, to the item of merchandise M. The display stand 50 comprises means for retracting the alarming power cord 42 onto the reel 44 in the form of a torsion spring 52 fixed at one end to the display stand and attached at the other end to a hub 54. Hub 54 has an exterior shape (e.g. rectangular, square, polygonal, etc.) that corresponds to a center sprocket 45 on the rotatable reel 44 such that the hub of the display stand 50 engages the center sprocket of the reel when the reel is inserted into the hollow interior of the display stand with the extensible and retractable portion of the alarming power cord 42 wound onto the reel 44.

The free end of the alarming power cord 42 may comprise an electrical connector 43, such a conventional micro-USB type power connector or a 30-pin Apple type power connector, adapted to engage a power input port P of an electronic item of merchandise M. If desired, a portion of the alarming power cord 42 adjacent the free end may be routed through an appropriately sized channel formed in a strain relief block 46 adapted to be attached to an exterior surface of the electronic item of merchandise M, for example, by a pressure sensitive adhesive (PSA) such as double sided tape. The strain relief block 46 prevents the electrical connector 43 of the alarming power cord 42 from being removed, disconnected or dislodged from the power input port P of the electronic item of merchandise M when tension is applied to the alarming power cord during extension and retraction of the alarming power cord from the reel 44 by a potential purchaser examining and/or operating the item of merchandise. An opening or recess 56 is formed in display stand 50 for permitting the portion of the alarming power cord 42 to be extended and retracted from the reel 44 within the hollow interior of the display stand 50. When a potential purchaser picks up the item of merchandise M, reel 44 rotates on hub 54 and torsion spring 52 is wound (i.e. tightened) as the alarming power cord 42 is unwound from the reel. As a result, reel 44 is biased by the wound torsion spring 52 to automatically retract the portion of the power alarming cord onto the reel as the potential purchaser returns the item of merchandise M to the display stand 50. As shown, the strain relief block 46 may optionally comprise one or more magnets 48 for engaging corresponding magnets 58 provided on the display stand 50 to position the item of merchandise M in a desired orientation on the display stand 50.

The merchandise security system 40 further comprises a power cable 60 that extends between a power source, such as a power strip, terminal or the like, that is electrically connected to a conventional 110 Volt Alternating Current (AC) power outlet. Alternatively, the power cable 60 may be directly connected to the power outlet. Regardless, the power cable 60 is electrically coupled to an electrical circuit, for example a printed circuit board (PCB), 62 disposed within the hollow interior of the display stand 50. As shown, PCB 62 may have electrical leads 64 that terminate in electrical terminals 66 configured to engage and electrically couple with electrical traces 67 formed on the interior surface of a door 51 of the display stand 50. Door 51 is adapted to be opened to receive reel 44 within the hollow interior of the display stand 50 and to be closed to retain the reel within the interior of the display stand. Electrical traces 67 are configured to electrically couple with corresponding electrical traces 47 provided on an exterior surface of reel 44. In turn, the electrical traces 47 of the reel 44 electrically couple with the electrical conductors disposed within the alarming power cord 42. As such, the power cable 60 is operable to provide electrical power to the item of merchandise M. As illustrated, the electrical traces 67 may be circular in configuration to facilitate electrical communication as the reel 44 rotates.

As previously described, the power cable 60 provides an electrical signal, including a power signal, to the alarming power cord 42 for charging and/or powering the electronic item of merchandise M via the electrical connector 43 and the power input port P of the item of merchandise. The merchandise security system 40 comprises monitoring electronics on the PCB 62 that monitor the electrical signal in the power cable 60 and the alarming power cord 42 to determine whether the electrical signal has been interrupted, for example, by disconnecting the alarming power cord from the power input port P of the item of merchandise M, or by electrically decoupling the alarming power cord 42 from the power cable 60 at the electrical traces 47, 67 of the rotatable reel 44 and the display stand 50, respectively, by opening the door 51, or by cutting/severing the alarming power cord 42 or the power cable 60 at any point between the power source and the item of merchandise M. In the event that the electrical signal is interrupted, PCB 62 may activate an audible and/or a visible alarm to alert store personnel to a potential theft of the electronic item of merchandise M, as previously described.

It is important to note that the merchandise security system 40 comprises an alarming power cord 42 that extends continuously from the power input port P of the electronic item of merchandise M to an electrical coupling (e.g. electrical traces 47, 67) disposed adjacent the central socket 45 of the rotatable reel 44 and the hub 54 of the display stand 50. Accordingly, the alarming power cord 42 does not comprise a first cable configured for electrical connection to a second cable selected from a plurality of adapter cables to provide an appropriate operating voltage and/or current to the electronic item of merchandise M. Furthermore, the alarming power cord 42 is not in direct wire-to-wire electrical communication with the power cable 60 since the alarming power cord and the power cable are separated by PCB 62, electrical leads 64, electrical terminals 66 and electrical traces 67, 47. In addition, the merchandise security system 40 of the present invention further comprises a strain relief block 46 for preventing the electrical connector 43 at the free end of the alarming power cord 42 from being removed, disconnected or dislodged from the power input port P of the electronic item of merchandise M.

The foregoing has described one or more embodiments of a merchandise security system. Embodiments according to the invention have been shown and described herein for purposes of illustrating and enabling the best mode of the invention. Those of ordinary skill in the art, however, will readily understand and appreciate that numerous variations and modifications of the invention may be made without departing from the spirit and scope of the invention. Accordingly, all such variations and modifications are intended to be encompassed by the appended claims.

That which is claimed is:

1. A merchandise security system for protecting an electronic item of merchandise from theft in a retail store, the merchandise security system comprising:
   a reel configured to store at least a portion of a cord thereon, the reel comprising at least one electrical coupling on an outer surface thereof;
   monitoring electronics configured to detect an interruption in a signal provided to the cord and to generate an alarm signal in response to an attempted theft of the electronic item of merchandise; and
   a housing defining an interior for receiving the reel therein, the reel configured to be removably inserted within the housing, the housing comprising at least one electrical coupling configured to engage with and electrically connect to the at least one electrical coupling of the reel when the reel is received within the housing, wherein the housing is a display stand configured to removably support the electronic item of merchandise thereon,
   wherein the at least one electrical coupling of the housing is configured to extend between an interior surface of the interior of the housing and the at least one electrical coupling of the reel when the at least one electrical coupling of the housing is engaged with and electrically connected to the at least one electrical coupling of the reel.

2. The merchandise security system of claim 1, further comprising a cord configured to be coupled to the electronic item of merchandise.

3. The merchandise security system of claim 2, further comprising a connector coupled to the cord and adapted to engage a power input port of the electronic item of merchandise.

4. The merchandise security system of claim 3, wherein the monitoring electronics is configured to detect, and generate an alarm signal in response to, removal of the connector from the power input portt.

5. The merchandise security system of claim 1, wherein the at least one electrical coupling of the reel comprises an electrical trace.

6. The merchandise security system of claim 1, wherein the at least one electrical coupling of the housing comprises an electrical terminal.

7. The merchandise security system of claim 1, wherein the at least one electrical coupling of the housing comprises an electrical terminal coupled to the interior surface of the interior of the housing.

8. The merchandise security system of claim 1, wherein the at least one electrical coupling of the housing comprises an electrical terminal engaged with the interior surface of the interior of the housing.

9. The merchandise security system of claim 1, wherein the at least one electrical coupling of the housing is engaged with the interior surface of the interior of the housing.

10. The merchandise security system of claim 1, wherein the at least one electrical coupling of the housing is engaged with the interior surface of the interior of the housing and the at least one electrical coupling of the reel when the at least one electrical coupling of the housing is engaged with and electrically connected to the at least one electrical coupling of the reel.

11. The merchandise security system of claim 1, wherein the at least one electrical coupling of the housing comprises an electrical terminal and an electrical lead electrically connected to a printed circuit board disposed within the interior of the housing.

12. The merchandise security system of claim 1, wherein the housing further comprises means for retracting the cord onto the reel.

13. The merchandise security system of claim 1, wherein the reel is rotatable for dispensing and collecting a predetermined portion of the cord.

14. The merchandise security system of claim 1, wherein the housing comprises a barrier configured to cover an opening to the interior of the housing for containing the reel therein and to be removed from the opening for inserting and removing the reel though the opening.

15. The merchandise security system of claim 14, wherein the barrier comprises a door.

16. The merchandise security system of claim 15, wherein the at least one electrical coupling of the housing is coupled to an interior surface of the barrier.

17. The merchandise security system of claim 1, wherein the at least one electrical coupling of the housing is coupled to the interior surface of the interior of the housing.

18. The merchandise security system of claim 1, wherein the at least one electrical coupling of the reel is circular in shape.

19. A method for securing an electronic item of merchandise from theft in a retail store, the method comprising:
inserting a reel within an interior of a display housing such that at least one electrical coupling of the display housing engages with and electrically connects to at least one electrical coupling on an outer surface of the reel and such that the at least one electrical coupling of the display housing extends between an interior surface of the interior of the display housing and the at least one electrical coupling of the reel, wherein the reel is configured to store at least a portion of a cord thereon;
covering the interior of the housing for retaining the reel therein;
attaching a block member to a rear surface of the electronic item of merchandise, the block member configured to be operably engaged with the cord;
placing the block member on the display housing such that the block member mates with and is supported by the display housing for display in a retail store; and
removing the block member and the electronic item of merchandise from the display housing such that the cord extends relative to the display housing.

20. The merchandise security system of claim 1, further comprising a block member configured to be secured to a rear surface of the electronic item of merchandise and further configured to be operably engaged with the cord.

21. The merchandise security system of claim 20, further comprising an adhesive for securing the block member to the electronic item of merchandise.

22. The merchandise security system of claim 20, wherein the block member is configured to mate with and be removably supported on the display stand.

23. The merchandise security system of claim 20, wherein an opening is defined in the display stand that is configured to receive the cord therethrough, wherein the block member is configured to be positioned over the opening when the block member is supported on the housing.

24. The merchandise security system of claim 1, further comprising a power cable for providing alternating current and electrically connected to the at least one electrical coupling of the housing.

25. The merchandise security system of claim 24, wherein the power cable is attached in a direct wire-to-wire connection with the printed circuit board.

26. The merchandise security system of claim 11, wherein the at least one electrical coupling of the reel is configured to be electrically connected to the printed circuit board via electrical connection with the at least one electrical coupling of the housing.

27. The merchandise security system of claim 1, wherein the at least one electrical coupling on the reel is electrically connected to the cord.

28. The merchandise security system of claim 1, wherein the housing is configured to receive only a single reel therein.

29. A merchandise security system for protecting an electronic item of merchandise from theft in a retail store, the merchandise security system comprising:
a cord configured to be coupled to an electronic item of merchandise;
a reel configured to store at least a portion of the cord thereon, the reel comprising at least one electrical coupling on an outer surface thereof;
monitoring electronics configured to detect an interruption in a signal provided to the cord and to generate an alarm signal in response to an attempted theft of the electronic item of merchandise;
a housing defining an interior for receiving the reel therein, the reel configured to be removably inserted within the housing, the housing comprising at least one electrical terminal configured to engage with and electrically connect to the at least one electrical coupling of the reel when the reel is received within the housing;
a printed circuit board disposed within the interior of the housing, wherein the at least one electrical coupling of the reel is configured to be electrically connected to the printed circuit board via engagement with the at least one electrical terminal of the housing; and
a power cable electrically connected to the printed circuit board,
wherein the at least one electrical terminal of the housing is configured to extend between an interior surface of the interior of the housing and the at least one electrical coupling of the reel when the at least one electrical terminal of the housing is engaged with and electrically connected to the at least one electrical coupling of the reel.

30. The merchandise security system of claim 29, further comprising an electrical lead electrically connected to the printed circuit board and the at least one electrical terminal.

31. The merchandise security system of claim 29, wherein the at least one electrical coupling on the reel is electrically connected to the cord.

32. The merchandise security system of claim 29, wherein the at least one electrical coupling of the reel is configured to be electrically connected to the power cable due to engagement with the at least one electrical terminal of the housing.

33. The merchandise security system of claim 29, wherein the at least one electrical coupling of the reel is not electrically connected to the printed circuit board in a direct wire-to-wire connection.

34. The merchandise security system of claim 29, wherein electrical connectivity is configured to be transferred from the power cable to the printed circuit board to the at least one electrical terminal and to the at least one electrical coupling.

35. The merchandise security system of claim 29, wherein the housing is configured to receive only a single reel therein.

36. The merchandise security system of claim 35, wherein the power cable is attached in a direct wire-to-wire connection with the printed circuit board.

37. The merchandise security system of claim 29, wherein the power cable is attached in a direct wire-to-wire connection with the printed circuit board.

38. The merchandise security system of claim 29, wherein the housing comprises a barrier configured to cover an opening to the interior of the housing for containing the reel therein and to be removed from the opening for inserting and removing the reel though the opening.

39. The merchandise security system of claim 29, further comprising a block member configured to be secured to a rear surface of the electronic item of merchandise and further configured to be operably engaged with the cord, wherein the housing is a display stand configured to removably support the electronic item of merchandise thereon, and wherein the block member is configured to mate with and be removably supported on the display stand.

40. The merchandise security system of claim 29, wherein the power cable is configured to transfer alternating current to the printed circuit board.

\* \* \* \* \*